United States Patent [19]

Ohgami et al.

[11] Patent Number: 4,555,762

[45] Date of Patent: Nov. 26, 1985

[54] ENGINE SPEED CONTROL SYSTEM

[75] Inventors: Masaaki Ohgami; Kazuo Hara; Kunihiro Abe, all of Tokyo, Japan

[73] Assignee: Fuji Jukogyo Kabushiki Kaisha, Tokyo, Japan

[21] Appl. No.: 334,060

[22] Filed: Dec. 23, 1981

[30] Foreign Application Priority Data

Dec. 27, 1980 [JP] Japan ................................ 55-187185

[51] Int. Cl.[4] ...................... B60K 41/02; G05D 13/02

[52] U.S. Cl. ......................... 364/431.09; 123/198 DB; 123/339

[58] Field of Search ...................... 364/431.09, 431.05, 364/431.07; 180/178, 179; 123/584, 352, 361, 198 DB, 339

[56] References Cited

U.S. PATENT DOCUMENTS

| | | | |
|---|---|---|---|
| 3,612,017 | 10/1971 | Ishizaki | 180/179 |
| 4,192,398 | 3/1980 | Hunt | 180/178 |
| 4,257,361 | 3/1981 | Kasiewicz | 123/352 |
| 4,372,265 | 2/1983 | Kasiewicz | 123/352 |

*Primary Examiner*—Felix D. Gruber

*Assistant Examiner*—Thomas G. Black

*Attorney, Agent, or Firm*—Martin A. Farber

[57] ABSTRACT

An engine speed control system for an internal combustion engine mounted on a vehicle comprises an actuator for actuating a throttle valve for increasing and decreasing the idling speed, an ignition switch for producing a signal during the operation of the engine, an engine speed signal generating circuit, an engine speed increasing signal generating circuit and an engine speed decreasing signal generating circuit, an actuator control circuit for operating the actuator in opposite directions in accordance with engine speed increasing and decreasing signals, a vehicle speed signal generating circuit, and an idling signal generating circuit for generating an idling signal in the idling operation of the engine. A stop switch is provided for producing a signal when the throttle valve reaches the closed position. A logic gate means is provided to be operated by the vehicle speed signal, idling signal, signal of the ignition switch and signal of the stop switch for turning off the actuator control circuit for stopping the operation of the actuator.

17 Claims, 9 Drawing Figures

ENGINE SPEED CONTROL SYSTEM

BACKGROUND OF THE INVENTION

The present invention relates to an engine idling speed control sysgem for a vehicle, and more particularly to a system which is provided with a device for preventing the running on of the engine operation after turning off of the ignition switch of the engine.

Heretofore, a closed loop feedback control system has been provided for controlling the idling speed to a desired idling speed by adjusting the amount of air or the amount of the air-fuel mixture to be induced in the engine in dependency on an error signal which is the difference between a desired reference idling speed and the detected idling speed.

On the other hand, it occasionally happens that the engine runs on even if the ignition switch is turned off. In order to prevent the running on of the engine operation, there has been proposed a system using an actuator in the above described automatic idling speed control system. The actuator comprises a motor and an axially movable rod driven by the motor. In the proposed system, a throttle valve follows the retraction of the rod of the actuator to close the induction passage of the engine. When the ignition switch is turned off, the rod of the actuator is further retracted, so that the throttle valve, rotates from the idling open position to a further closed position to stop the engine running.

In such a system, the rod of the actuator moves a considerablly long distance, that is the actuator must be operated over a wide range. After the throttle valve has reached the closed position, the rod of the actuator is further retracted to a predetermined position.

It is disadvantageous that the actuator has a wide operational range for the maintenance of the actuator, because such a wide range operation is more apt to cause breakdown of the actuator.

SUMMARY OF INVENTION

The object of the present invention is to provide an engine speed control system which may decrease the range of the actuator operation to the minimum necessary range.

According to the present invention there is provided an engine speed control system for an internal combustion engine mounted on a vehicle, said engine having a carburetor with a throttle valve, comprising an actuator for actuating said throttle valve;

means for causing said throttle valve to follow said actuator for closing and opening the induction passage of said engine;

an engine speed signal generating circuit for producing an engine speed signal dependent on the engine speed;

comprising circuit means for comparing said engine speed signal with a predetermined reference value and for producing engine speed control signals representing whether the level of said engine speed signal is higher than said predetermined reference value or not;

an actuator control circuit for operating said actuator in opposite directions in accordance with said engine speed control signals;

an ignition switch for producing a signal during the operation of said engine;

logic gate means for controlling said engine speed control signals;

a vehicle speed signal generating circuit for generating a vehicle speed signal dependent on the speed of said vehicle;

an idling signal generating circuit for generating an idling signal in the idling operation of said engine; and switch means for producing an output signal when said throttle valve reaches the closed position;

said logic gate means being so arranged as to be closed under the condition that said vehicle speed signal, the signal of said ignition switch and the signal of said switch means are applied for turning off said actuator control circuit, in order to stop the actuator operation.

Other objects and features of the present invention will be fully described with reference to the accompanying drawings.

DETAILED DESCRIPTION OF THE PREFERRED EMBODIMENTS

Figure 1:
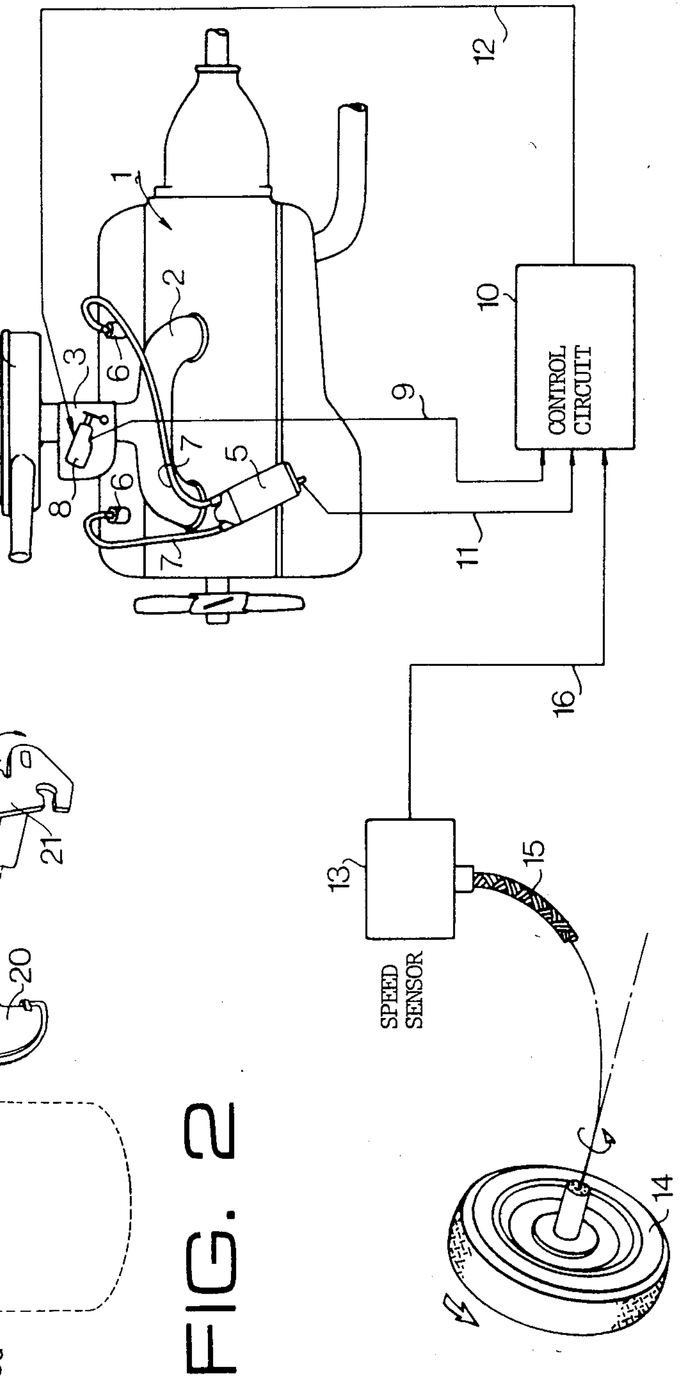
FIG. 1 is a schematic diagram showing a system of the present invention.

Referring to FIG. 1, an internal combustion engine 1 mounted on a vehicle is provided with an intake manifold 2, a carburetor 3, an air cleaner 4, an ignition coil 5, and spark plugs 6 connected to the ignition coil 5, respectively. An actuator 8 for operating a throttle valve in the carburetor is supported on the side wall of the carburetor 3. The actuator 8 includes an idling sensing switch which is hereinafter described. An idling signal produced by the idling sensing switch in the actuator 8 is sent to a control circuit 10 by a lead 9. Pulses produced in synchronism with ignition pulses are also supplied to the control circuit 10 through a lead 11. The output of the control circuit 10 is connected to the actuator 8 by a lead 12.

A vehicle speed sensor 13 is connected to an axle for a front wheel 14 of the vehicle by a speedometer cable 15. The output of the vehicle speed sensor 13 is applied to the control circuit 10 by a lead 16.

Figure 2:
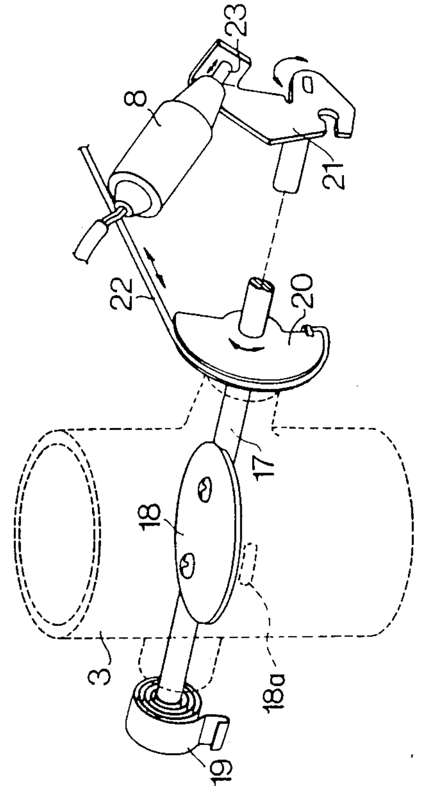
FIG. 2 is a perspective view showing a carburetor and attachments thereof.

Referring to FIG. 2, a throttle shaft 17 of a throttle valve 18 is rotatably supported in the carburetor 3, one end of the throttle shaft 17 being secured to the inner end of a spring 19 which exerts a spring force on the throttle shaft 17 so as to bias the throttle valve 18 to close. A wire connector 20 and a lever 21 are secured to the throttle shaft at the other side of the carburetor. An end of an accelerator wire 22 connected to an accelerator pedal of the vehicle is fixed to the wire connector 20 and an end of a rod 23 of the actuator 8 is adjacent to an end portion of the lever 21.

Figure 3:
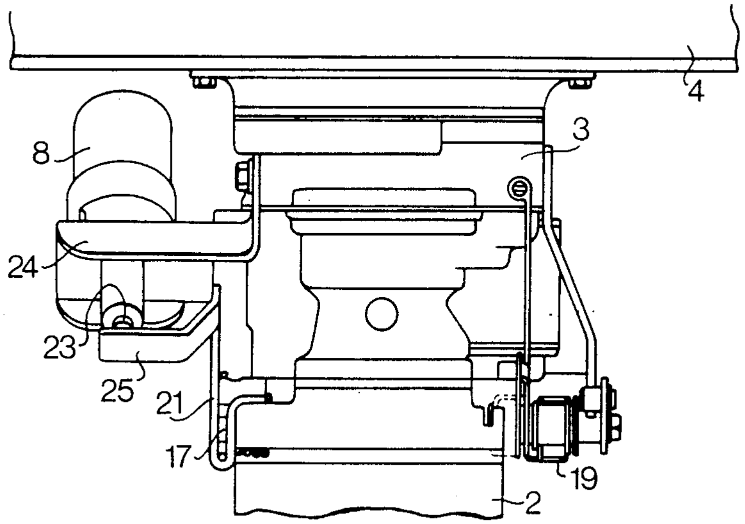
FIG. 3 is a front view of an actuator for the carburetor.
Figure 4:
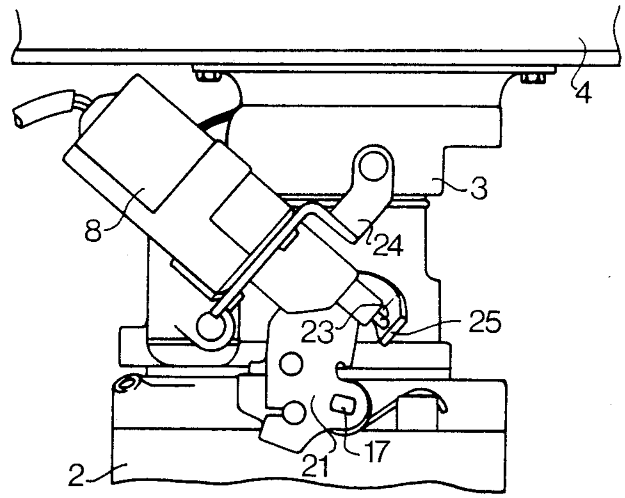
FIG. 4 is a side view of the actuator.

Referring to FIGS. 3 and 4, the actuator 8 is secured to a support 24 secured to the wall of the carburetor 3 and the end of the rod 23 is adjacent to a bent end portion 25 of the lever 21. The end of the rod 23 and the end portion 25 cooperate to act as the idling sensing switch as will be hereinafter described.

Figure 5:
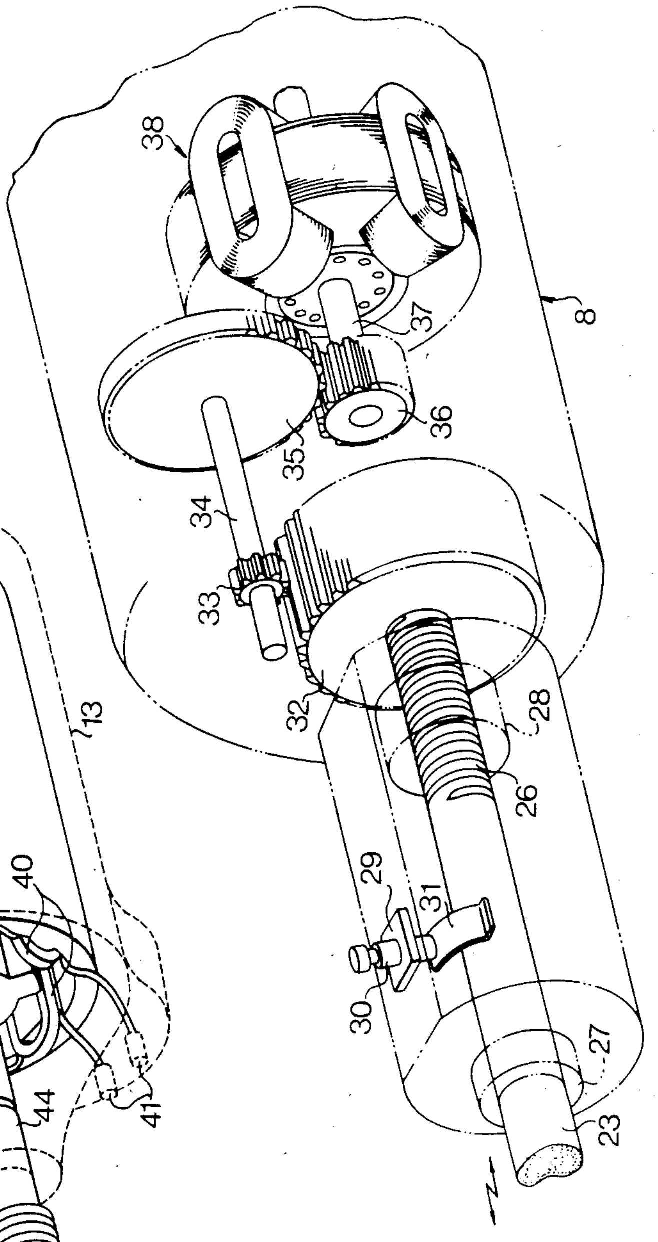
FIG. 5 is a perspective view showing an internal construction of the actuator.

FIG. 5 shows an internal construction of the actuator 8. The rod 23 is rotatably supported by a bearing 27. The rod 23 is formed with a thread 26 which is engaged with a female screw formed in a bearing 28. The rod 23 is secured to a gear 32. Although the rod is made of metal, the bearings 27, 28 and the gear 32 secured to the rod are made of plastic. Accordingly the rod is insulated from the body of the actuator 8. A terminal 30 is secured to the body of the actuator through an insulation plate 29. A brush 31 is secured to the terminal 30 and elastically engaged with the periphery of the rod 23.

The gear 32 engages with a pinion 33 securely mounted on a shaft 34, the end of which has a gear 35 securely mounted thereon. The gear 35 is engaged with a pinion 36 secured to a shaft 37 of a motor 38.

Figure 6:
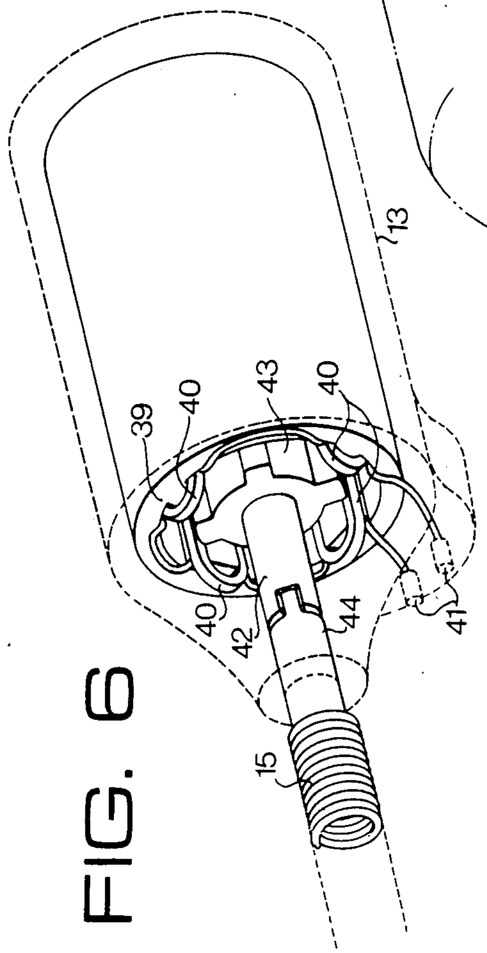
FIG. 6 is a perspective view showing a vehicle speed sensor.

Referring to FIG. 6, the vehicle speed sensor 13 comprises a cylindrical core 39 having coils 40 which are connected in series and connected to a pair of terminals 41, a rotor 43 secured to a shaft 42 which is connected to the speedometer cable 15 through a joint 44. Thus, rotation of the rotor 43 produces an output voltage on terminals 41 according to the vehicle speed.

Figure 7:
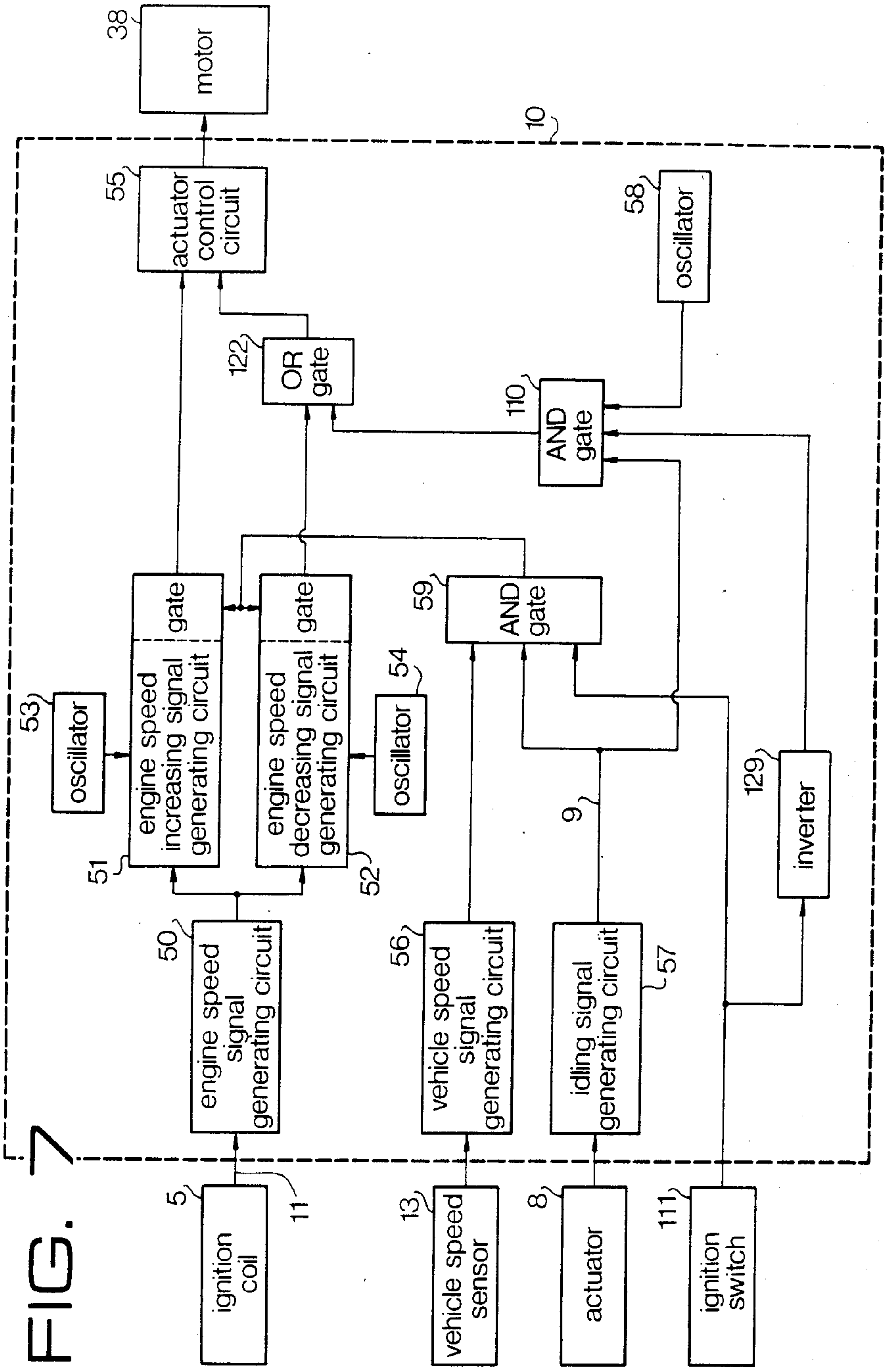
FIG. 7 is a block diagram of a control circuit employed in the system.
Figure 8:
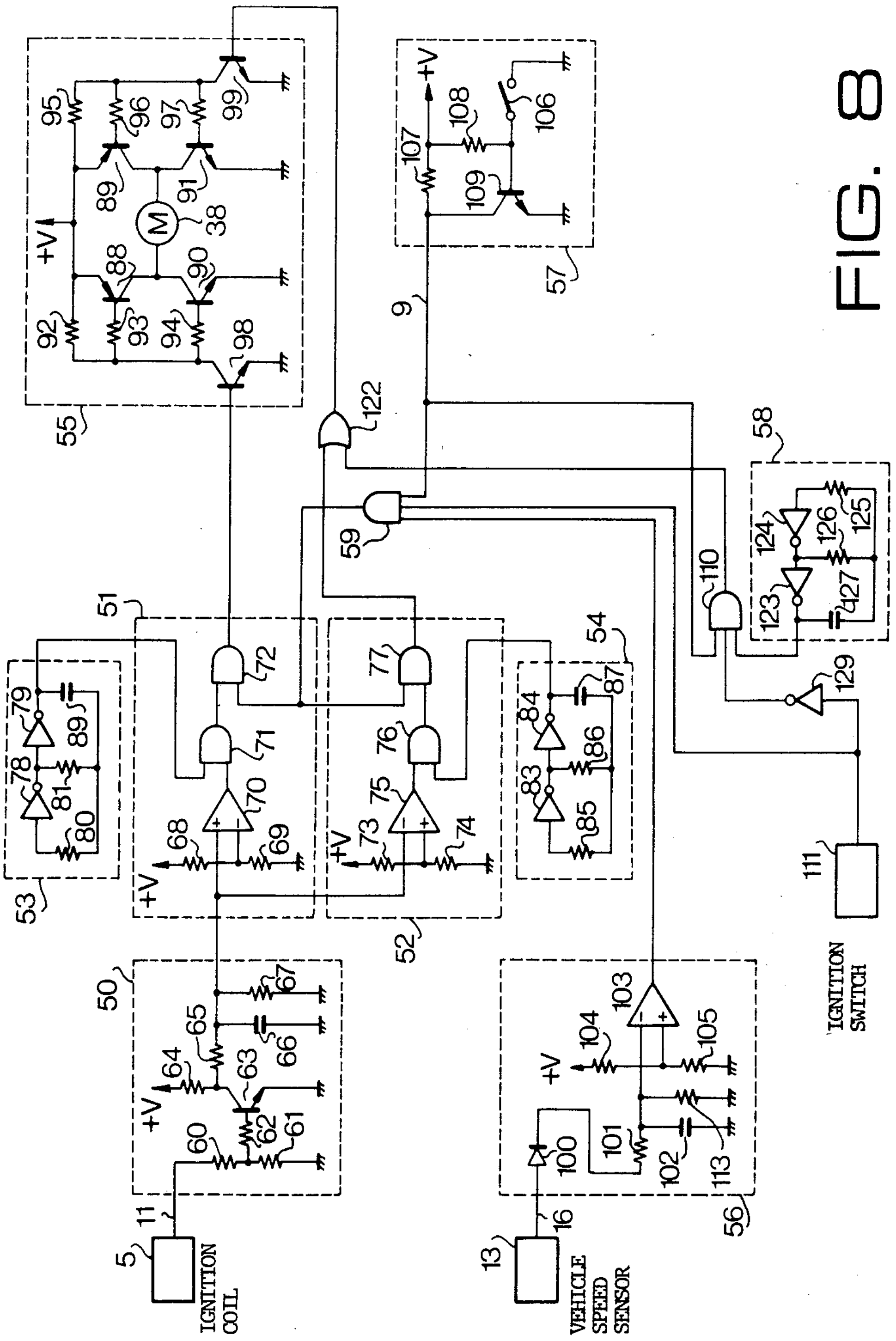
FIG. 8 is an electric circuit of the control circuit of FIG. 7.

Referring to FIGS. 7 and 8, the control circuit 10 generally comprises an engine speed signal generating circuit 50, an engine speed increasing signal generating circuit 51, an engine speed decreasing signal generating circuit 52, oscillators 53 and 54, an actuator control circuit 55 for idling speed control, a vehicle speed signal generating circuit 56, an idling signal generating circuit 57, an oscillator 58, an AND gate 59 as a control gate for idling speed control, an AND gate 110, an inverter 129, and an OR gate 122.

The engine speed signal generating circuit 50 is applied with pulses from the ignition coil 5, which causes the switching of a transistor switching circuit comprising resistors 60, 61 62 and a transistor 63. The collector of the transistor is connected to a positive source through a resistor 64 and to an integrating circuit comprising resistors 65, 67 and a capacitor 66.

The output of the engine speed signal generating circuit 50 is connected to a non-inverting input of a comparator 70 of the engine speed increasing signal generating circuit 51 and connected to an inverting input of a comparator 75 of the engine speed decreasing signal generating circuit 52. The inverting input of the comparator 70 is connected to a voltage divider comprising resistors 68 and 69 and the output thereof is connected to an AND gate 71. The output of the AND gate 71 is connected to an AND gate 72 for producing an engine speed increasing signal. The non-inverting input of the comparator 75 is connected to a voltage divider comprising resistors 73 and 74, and the output thereof is connected to an AND gate 76. The output of the AND gate 76 is connected to an AND gate 77 for producing an engine speed decreasing signal. The oscillators 53 and 54 comprise inverters 78, 79, 83 and 84, resistors 80, 81, 85 and 86, and capacitors 82 and 87, respectively. Pulses from the oscillator 53 are applied to the AND gate 71 and pulses from the oscillator 54 are applied to the AND gate 76. The AND gates 72 and 77 are applied with an output of the AND gate 59. The output of the AND gate 77 is connected the OR gate 122.

The actuator control circuit 55 for idling speed control has PNP transistors 88 and 89, NPN transistors 90 and 91 which are connected with each other in bridge form. The motor 38 is connected between the collectors of two pairs of the transistors. The actuator control circuit 55 further comprises a pair of NPN transistors 98 and 99 and resistors 92 to 97 for applying voltages to each transistor. The base of the transistor 98 is applied with an output of the AND gate 72, and the base of the transistor 99 is applied with an output of the OR gate 122.

The output of vehicle speed sensor 13 is connected to a diode 100 of the vehicle speed signal generating circuit 56, which is in turn connected to an inverting input of comparator 103 through a resistor 101. A capacitor 102 and a resistor 113 are also connected to the inverting input of the comparator. The non-inverting input of the comparator 103 is connected to a voltage divider comprising resistors 104 and 105. The output of the comparator 103 is connected to one of the inputs of the AND gate 59.

The idling signal generating circuit 57 includes an idling sensing switch 106 which is formed by the end of the rod 23 and the end portion 25 of the lever 21. An end of the switch 106 is grounded and the other end is connected to the supply through a resistor 108 and to a base of a transistor 109. The collector of the transistor 109 is connected to the supply through a resistor 107 and to inputs of the AND gates 59, 110.

The oscillator 58 comprises inverters 123 and 124, resistors 125, 126 and a capacitor 127 for producing a predetermined pulse train. The pulse train is applied to the AND gate 110. An ignition switch 111 is adapted to produce a high level output when the engine is operated, that is the switch is turned on and to produce a low level output when the switch is turned off. The output of the ignition switch is connected to the AND gate 59 and to the AND gate 110 through an inverter 129. The output of the AND gate 110 is connected to the OR gate 122.

In operation, pulses proportional to the ignition pulses are applied to the engine speed generating circuit 50. Rotation of the front wheel 14 causes the rotor 43 of the vehicle speed sensor 13 to rotate to generate an output (alternating current) in proportion to the vehicle speed on terminals 41 (FIG. 6). As to the idling sensing switch 106, if the accelerator pedal is depressed for the acceleration of the engine, the end portion 25 of the level 21 secured to the throttle shaft 17 is disengaged from the end of the rod 23, which means opening of the idling sensing switch 106.

Pulses applied to the engine speed signal generating circuit 50 turns the transistor 63 on and off. The voltage on the end of the capacitor 66 varies in inverse proportion to the engine speed. The voltage at the capacitor 66 is applied to the comparators 70 and 75. When the input voltage of the comparator 70 is higher than the lower limit reference voltage at the inverting input, which means low engine speed, a high level output signal is applied to the AND gate 71. The AND gate 71 produces pulses according to the input pulses from the oscillator 53, which are applied to the AND gate 72. When the input voltage of the comparator 75 decreases below the upper limit reference voltage at the non-inverting input, which means the engine speed becomes high, a high level output signal is applied to the AND gate 76. The AND gate 76 produces pulses which are applied to the AND gate 77 similarly to the operation of the AND gate 71.

Figure 9:
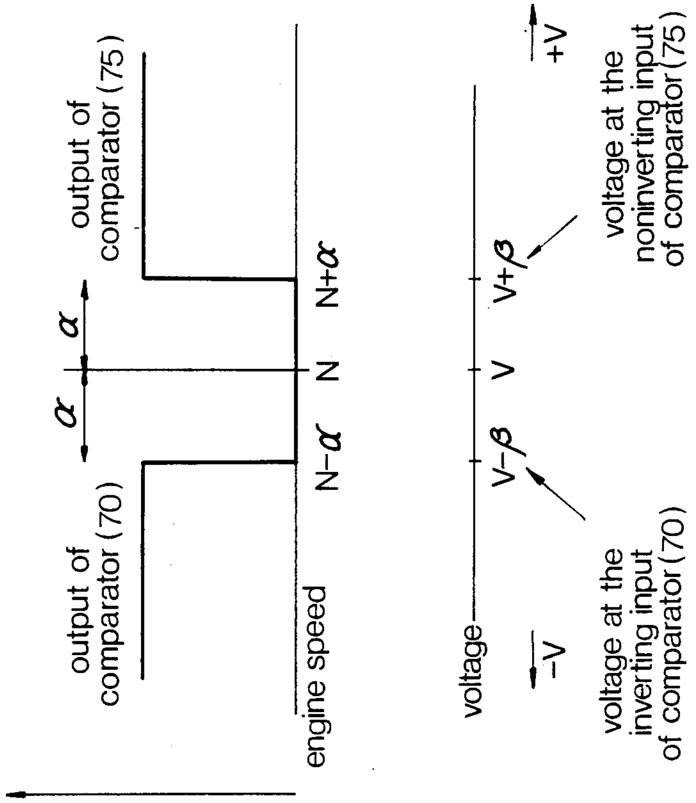
FIG. 9 is a graph showing the outputs of comparators in the control circuit.

Referring to FIG. 9, $V-\beta$ is the lower limit reference voltage at the inverting input of the comparator 70 and $V+\beta$ is the higher limit reference voltage at the non-inverting input of the comparator 75. Therefore, the comparator 70 produces the high level output at the engine speed $N-\alpha$ corresponding to the voltage $V-\beta$ and the comparator 75 produces the output at the engine speed $N+\alpha$ corresponding to the voltage $V+\beta$. Accordingly, there is provided a non-operation zone $\pm\alpha$ on both sides of a desired idling speed N.

The vehicle speed signal from the vehicle speed sensor 13 is applied to the comparator 103 through the diode 100. When the vehicle speed signal exceeds a predetermined level of the input signal at the non-inverting signal of the comparator 103, the output of the comparator 103 changes from a high level to a low level. The changing of the output is made at a low vehicle speed, for example at 8 Km/h.

When the idling sensing switch 106 is off, that is the lever 21 is disengaged from the rod 23, the transistor 109 is turned on, so that the idling signal on the lead 9 is at a low level. However, if the idling sensing switch 106 is on, the transistor 109 is turned off, so that the idling signal goes to a high level. The output of the ignition switch 111 is at a high level, which is applied to the AND gate 59.

It will be seen that the AND gates 72 and 77 produce a high level output when the input applied from the AND gate 59 is at a high level and that the AND gate 59 produces a high level output when all inputs applied from the vehicle speed signal generating circuit 56, idling signal generating circuit 57 and ignition switch 111 are at high levels. The conditions are as follows:

(A) Vehicle speed is lower than a predetermined speed:

(B) The lever 21 engages the end of the rod 23 (idling state):

(C) The ignition switch is turned on.

Under these conditions, the AND gate 59 produces a high level output to open AND gates 72 and 77 for controlling idling speed.

When engine idling speed is lower than the speed $N-\alpha$ (FIG. 9), the comparator 70 produces a high level output which actuates the AND gate 71 to produce pulses. The pulses are applied to the base of the transistor 98 through the AND gate 72 to periodically turn on the transistor. As a result, the transistors 88 and 91 are turned on, so that current passes through the transistor 88, motor 38 , and transistor 91, which causes the rotation of the motor 38 in one direction. The rotation of the motor is transmitted to the rod 23 through the gears 36, 35, 33 and 32, so that the rod 22 is projected to push the lever 21. Thus, the throttle valve 18 is rotated to open the induction passage to increase the engine idling speed.

When the engine idling speed exceeds the speed $N+\alpha$, the comparator 75 produces a high level output, so that the transistor 99 is turned on in a similar manner to the circuit 51. Thus, the transistors 89 and 90 are turned on and the motor 38 is rotated in the reverse, so that the rod 23 is retracted. The throttle valve 18 is rotated by the spring 19 to close the passage to decrease engine idling speed. Thus, the engine idling speed is automatically maintained at the desired idling speed N.

Conditions where the above-described speed control is not effected are as follows:

(D) Vehicle speed is higher than a predetermined value and the output of the circuit 56 changes to a low level:

(E) Throttle valve is opened and the idling sensing switch 106 is turned off, so that the idling signal goes to a low level;

(F) The ignition switch is turned off.

Under one of these conditions, the output of the AND gate 59 goes to a low level thereby stopping the motor control operation.

Describing the operation for prevention of the running on of the engine, when the ignition switch 111 is turned off, the output thereof changes to a low level to stop the automatic engine speed control. The AND gate 110 is applied with a high level output of the inverter 129 and with a high level idling signal from the circuit 57. (the switch 106 is closed) Accordingly, the AND gate 110 produces output pulses in accordance with the pulses fed from the oscillator 58. The output pulses of the AND gate 110 are applied to the transistor 99 through the OR gate 122. Thus, the motor 38 is rotated in the reverse direction to retract the rod 23. Thus, the throttle valve is further rotated from the idling open position by the spring 19 at a low speed. When the throttle valve reaches the closing position, the throttle valve is stopped by a stopper 18*a* causing the engine to stop. Thus, the running on of the engine can be prevented. At the time when the throttle valve stops, the rod 23 disengages from the lever 21, that is the switch 106 is turned off. As a result, the idling signal on the line 9 goes to a low level, so that the AND gate 110 is closed to turn off the transistor 99. Thus, the motor 38, is stopped at the moment when the rod 23 is disengaged from the lever 21.

From the foregoing, it will be understood that, in accordance with the present invention, the operation of the actuator for preventing the running on of the engine can be performed within a necessary minimum range thereby decreasing the occurrence of breakdown of the actuator.

What is claimed is:

1. In a system for controlling the idling speed for an internal combustion engine mounted on a vehicle, said engine having an induction passage and a throttle valve in said induction passage, an improvement comprising:

ignition switch means for producing an ignition switch signal when said ignition switch means is opened;

actuator means, upon occurrence of said ignition switch signal, for undergoing movement for operatively moving said throttle valve into a closed position closing said induction passage;

sensing switch means for producing a closed throttle valve position signal when said throttle valve reaches said closed position; and means responsive to said closed throttle valve position signal for stopping the movement of said actuator means substantially when said throttle valve reaches said closed position, whereby movement of said actuator means is minimized and the engine is prevented from running on after the ignition switch means is opened.

2. The system according to claim 1, wherein said actuator means includes an actuating member undergoing said movement of said actuator means and for operatively moving said throttle valve.

3. The system according to claim 2, further comprising
connecting means connected to said throttle valve and abutting said actuating member for moving said throttle valve operatively via said actuating member.

4. The system according to claim 3, wherein
said sensing switch means comprises abutting portions of said actuating member and said connecting means, said actuator means for continuing said movement of said actuating member, when said throttle valve reaches said closed position, in a direction away from said connecting means so as to open said sensing switch means for producing said closed throttle valve position signal.

5. The system according to claim 4, further comprising
spring means for biasing said connecting means against said actuating member and to move said throttle valve into said closed position.

6. The system according to claim 5, wherein
said connecting means and said throttle valve form a movable unit,
stopper means for stopping said unit when said throttle valve reaches said closed position, said actuating member continuing its said movement thereafter until said sensing switch means opens.

7. The system according to claim 3, wherein
said sensing switch means comprises abutting portions of said actuator means and a member connected to said throttle valve, said actuator means for continuing said movement, when said throttle valve reaches said closed position, in a direction away from said member so as to open said sensing switch means for producing said closed throttle valve position signal.

8. The system according to claim 1, further comprising
an engine speed signal generating circuit means for producing an engine speed signal dependent on engine speed,
comparing circuit means for comparing said engine speed signal with a predetermined reference value and for producing engine speed control signals representing whether the level of said engine speed signal is higher than said predetermined reference value or not,
an actuator control circuit means for operating said actuator means in the throttle valve opening direction or the throttle valve closing direction in accordance with said engine speed control signals respectively.

9. The engine speed control system according to claim 1, wherein
said actuating member is a rod.

10. The engine speed control system according to claim 1, further comprising
spring means for biasing said throttle valve into said closed position, said actuator means is mounted so as to counteract said spring means and such that said movement of said actuator means operatively releases said spring means moving said throttle valve into said closed position.

11. The engine speed control system according to claim 10, wherein
said movement of said actuator means is retraction and said spring means biases said throttle valve so as to operatively abut against said actuator means.

12. In a system for controlling the idling speed for an internal combustion engine mounted on a vehicle, said engine having an induction passage and a throttle valve in said induction passage, wherein:
said throttle valve has a closed position closing said induction passage;
an actuator means having an actuating member disposed to perform movement;
a lever operatively connected to said throttle valve for joint movement therewith; and
means comprising a spring for biasing said lever against said actuating member so that said lever follows said actuating member of the actuator means and simultaneously said spring means via said lever for operatively biasing said throttle valve in a direction of closing the induction passage;
said actuating member upon said movement for actuating said throttle valve via said lever such that said spring means closes said throttle valve;
ignition switch means for producing a first signal having a first logic level during normal operation of said engine and producing an ignition switch off signal having an other logic level when the ignition switch means is opened;
an idling signal generating circuit including an idling sensing switch means for generating an idling signal having a first logic level in idling operation of said engine and respectively for producing a throttle valve closed signal having an other logic level when said throttle valve reaches the closed position; and
said actuator means upon occurrence of said ignition switch off signal cooperates with said lever by said movement of said actuating member in a first direction such that said throttle valve is moved via said spring means to said closed position closing said induction passage and said actuating member continues moving in said first direction, said actuating member being disposed so as to disengage from said lever by continued movement of the actuating member in said first direction substantially when the throttle valve and said lever stop at said closed position; and
logic gate means responsive to said ignition switch off signal of said ignition switch means and to said idling signal of said idling signal generating circuit for producing an output for operating said actuator means so as to operate said actuating member of said actuator means to perform said movement in said first direction such that the throttle valve is moved to said closed position closing said induction passage, and said logic gate means respectively responsive to said throttle valve closed signal of said idling signal generating circuit at the closed position for stopping the movement of said actuating member of said actuator means.

13. The engine speed control system according to claim 12, wherein
said idling sensing switch means is comprised between an end of said actuating member and said lever.

14. The engine speed control system according to claim 12, further comprising
operating signal generating means for applying an operating signal to said actuator means via said logic gate means for said operating of said actuator means so as to operate said actuating member of said actuator means to perform said movement in said first direction such that the throttle valve is moved to said closed position closing said induction passage in response to said ignition switch off signal of said ignition switch means and to said idling signal of said idling signal generating circuit.

15. The engine speed control system according to claim 14, wherein said operating signal generating means is an oscillator.

16. The engine speed control system according to claim 12, further comprising an engine speed signal generating circuit means for producing an engine speed signal dependent on engine speed, comparing circuit means for comparing said engine speed signal with a predetermined reference value and for producing engine speed control signals representing whether the level of said engine speed signal is higher than said predetermined reference value or not, an actuator control circuit means for operating said actuator member in a second direction such that said throttle valve is moved in an opening direction relative to said induction passage or said first direction such that the throttle valve is moved in a closing direction relative to said induction passage in accordance with said engine speed control signals.

17. The engine speed control system according to claim 12 wherein said throttle valve is rotatably mounted in said induction passage, said lever comprises means for rotating said throttle valve via an end of said actuating member, said idling sensing switch is comprised between the end of said actuating member and said lever for rotating said throttle valve.

* * * * *